(12) United States Patent
Wang et al.

(10) Patent No.: US 11,586,626 B1
(45) Date of Patent: Feb. 21, 2023

(54) OPTIMIZING CLOUD QUERY EXECUTION

(71) Applicant: International Business Machines Corporation, Armonk, NY (US)

(72) Inventors: Xiaobo Wang, Beijing (CN); Shuo Li, Beijing (CN); Sheng Yan Sun, Beijing (CN); Xin Peng Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/517,814

(22) Filed: Nov. 3, 2021

(51) Int. Cl.
*G06F 16/2453* (2019.01)

(52) U.S. Cl.
CPC .............................. *G06F 16/24547* (2019.01)

(58) Field of Classification Search
CPC .................................................. G06F 16/24547
See application file for complete search history.

(56) References Cited

U.S. PATENT DOCUMENTS

| | | | |
|---|---|---|---|
| 7,844,608 | B2 | 11/2010 | Natkovich |
| 10,810,157 | B1 | 10/2020 | Paterra |
| 2002/0143754 | A1 | 10/2002 | Paulley |
| 2006/0122965 | A1* | 6/2006 | Adams ................... G06F 16/24 |
| 2007/0136244 | A1 | 6/2007 | MacLaurin |
| 2009/0172169 | A1* | 7/2009 | Ramaswamy ...... H04W 88/182 |
| | | | 709/227 |
| 2011/0202929 | A1 | 8/2011 | Schleimer |
| 2012/0005196 | A1* | 1/2012 | Horii ................. G06F 16/24534 |
| | | | 707/769 |
| 2013/0080463 | A1* | 3/2013 | Yamada .............. G06F 16/2453 |
| | | | 707/769 |
| 2013/0132371 | A1 | 5/2013 | Bharath |
| 2015/0088913 | A1* | 3/2015 | Feng ..................... G06F 16/284 |
| | | | 707/751 |
| 2017/0308592 | A1* | 10/2017 | Agrawal .............. G06F 16/211 |

FOREIGN PATENT DOCUMENTS

| | | |
|---|---|---|
| CN | 102402507 A | 4/2012 |
| CN | 103310011 A | 9/2013 |

(Continued)

OTHER PUBLICATIONS

Larsen, G. (Feb. 22, 2021). SQL Server Authentication Methods, logins, and database users. Simple Talk. Retrieved Aug. 22, 2022, from https://www.red-gate.com/simple-talk/databases/sql-server/learn/sql-server-authentication-methods/ (Year: 2021).*

(Continued)

*Primary Examiner* — William Spieler
(74) *Attorney, Agent, or Firm* — Gilbert Harmon, Jr.

(57) ABSTRACT

An approach for optimizing server application response times. The approach creates a trust sharing context between edge clients and a server application. The approach identifies similar requests from the edge clients to the server application. The approach integrates the similar requests into a single request and normalizes the single request into a normalized data structure. The approach sends the single request to the server application for processing and receives the server application response to the single request. The approach distributes at least a portion of the response to the edge clients.

20 Claims, 6 Drawing Sheets

(56) References Cited

FOREIGN PATENT DOCUMENTS

CN          106303704 A       1/2017
CN          107317841 A       11/2017

OTHER PUBLICATIONS

"How To Optimize Database Response?", ApacheBooster, Jul. 31, 2018, 6 pages, <https://apachebooster.com/blog/how-to-optimize-database-response/>.

Bharat et al., "A system and method to build an SQL Interface for cloud databases with efficient query optimizer", An IP.com Prior Art Database Technical Disclosure, IP.com No. IPCOM000205545D, IP.com Electronic Publication Date: Mar. 30, 2011, Copyright: Infosys Technologies Limited, 7 pages.

Ghosh et al., "Plan Selection based on Query Clustering", Proceedings of the 28th VLDB Conference, Hong Kong, China, 2002, 12 pages.

Mell et al., "The NIST Definition of Cloud Computing", Recommendations of the National Institute of Standards and Technology, Special Publication 800-145, Sep. 2011, 7 pages.

International Search Report and Written Opinion, International Application No. PCT/CN2022/121881, International Filing Date Sep. 27, 2022, 8 pages.

\* cited by examiner

OPTIMIZING CLOUD QUERY EXECUTION

TECHNICAL FIELD

The present invention relates generally to cloud query optimization, and specifically, to optimizing cloud storage query execution based on intelligent server request reduction.

BACKGROUND

Cloud databases are widely used in current cloud systems. Typically, the systems are divided into clusters to provide for an increased flow in database requests. In another consideration, cloud databases have the diversification of requirements of development demands from software developers and the of real-time performance demands of cloud database clients. Although improvements in cloud database performance have occurred, an undesirable side effect has been the results of one cluster cannot be shared with another cluster, leading to a duplication of efforts.

Many modern enterprise-based edge applications such as data acquisition, mining operations, intelligent manufacturing, traffic control, etc. are characterized by massive real-time data transmission between edge devices and cloud enterprise storage, which results in an escalation above pain points in efficiency of response times of data queries.

For example, consider the application of edge computing to intelligent manufacturing. Current edge computing's deficiency in facilitating autonomous across-edge data sharing limits further productivity enhancement. In many manufacturing scenarios, multiple parts are involved in interconnected validation when they are assembled. In current edge computing infrastructure, model and part metadata queries can only send/receive individual query/data to a central cloud, then the queries are distributed to each part device from the central cloud.

Further, many co-located manufacture devices are manipulating similar parts which usually induce similar queries and data contents. Specifically, when a joint-part model validation is performed towards member parts in individual devices, the validation model for individual devices is the same and should be shared in a more efficient way but must be done in many parallel queries.

BRIEF SUMMARY

According to an embodiment of the present invention, a computer-implemented method for optimizing server application response times, the computer-implemented method comprising: creating, by one or more processors, a trust sharing context between edge clients and a server application; identifying, by the one or more processors, similar requests from the edge clients to the server application; integrating, by the one or more processors, the similar requests into a single request; normalizing, by the one or more processors, the single request based in a normalized data structure; sending, by the one or more processors, the single request to the server application; receiving, by the one or more processors, a response to the single request from the server application; and distributing, by the one or more processors, at least a portion of the response to the edge clients.

According to an embodiment of the present invention, a computer program product for optimizing server application response times, the computer program product comprising: one or more non-transitory computer readable storage media and program instructions stored on the one or more non-transitory computer readable storage media, the program instructions comprising: program instructions to create a trust sharing context between edge clients and a server application; program instructions to identify similar requests from the edge clients to the server application; program instructions to integrate the similar requests into a single request; program instructions to normalize the single request based in a normalized data structure; program instructions to send the single request to the server application; program instructions to receive a response to the single request from the server application; and program instructions to distribute at least a portion of the response to the edge clients.

According to an embodiment of the present invention, a computer system for optimizing server application response times, the computer system comprising: one or more computer processors; one or more non-transitory computer readable storage media; and program instructions stored on the one or more non-transitory computer readable storage media, the program instructions comprising: program instructions to create a trust sharing context between edge clients and a server application; program instructions to identify similar requests from the edge clients to the server application; program instructions to integrate the similar requests into a single request; program instructions to normalize the single request based in a normalized data structure; program instructions to send the single request to the server application; program instructions to receive a response to the single request from the server application; and program instructions to distribute at least a portion of the response to the edge clients.

Other aspects and embodiments of the present invention will become apparent from the following detailed description, which, when taken in conjunction with the drawings, illustrate by way of example the principles of the invention.

DETAILED DESCRIPTION

Figure 1:
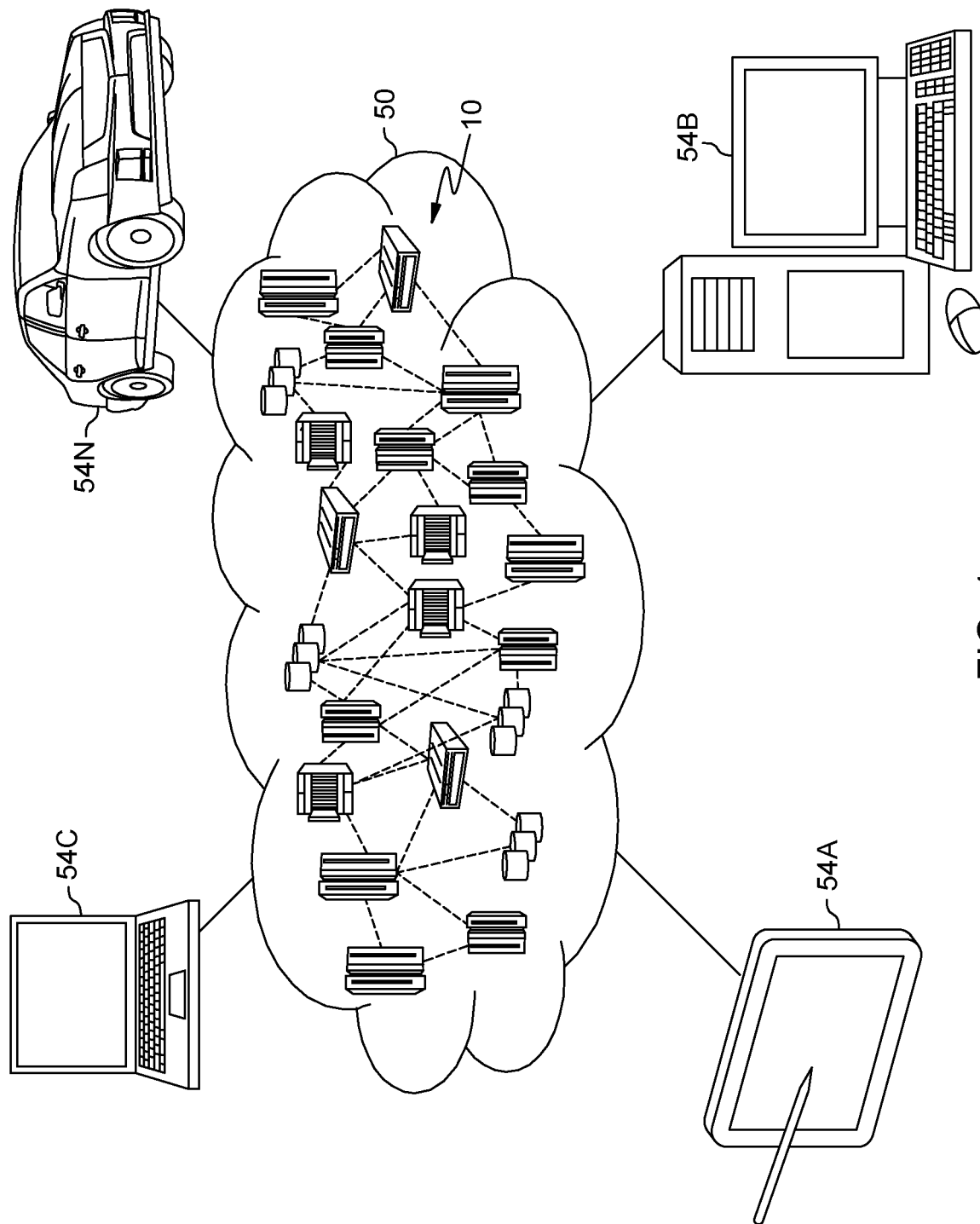
FIG. 1 depicts a cloud computing environment, according to embodiments of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of optimizing cloud storage query execution based on intelligent server request reduction by providing a trust sharing context near the client edge. It should be noted that the optimizations employed in these embodiments also include enhancement to data structures associated with protocols for query transport.

Embodiments of the present invention can provide capability to setup an application trust sharing context with an application client edge, integrate multiple application client edge requirements together into a single integrated query, normalize the integrated query with structure and node business status, submit the integrated query to a target database server, receive the integrated query result from the database server and distribute the integrated query result to the client edge applications.

Embodiments of the present invention can provide advantages such as, but not limited to, Improve the database server response by reducing the number of requests to the server and reducing the system consumption, reducing the organization and coordination workload on centralized data center/cloud, increasing the utilization rate of edge devices to mirror a single device access, leveraging multi-edge clusters, reducing bandwidth and latency issues between edge devices and a centralized data center/cloud, improving data processing efficiency based on data is processing and analysis closer to edge devices, and faster response times for edge tasks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
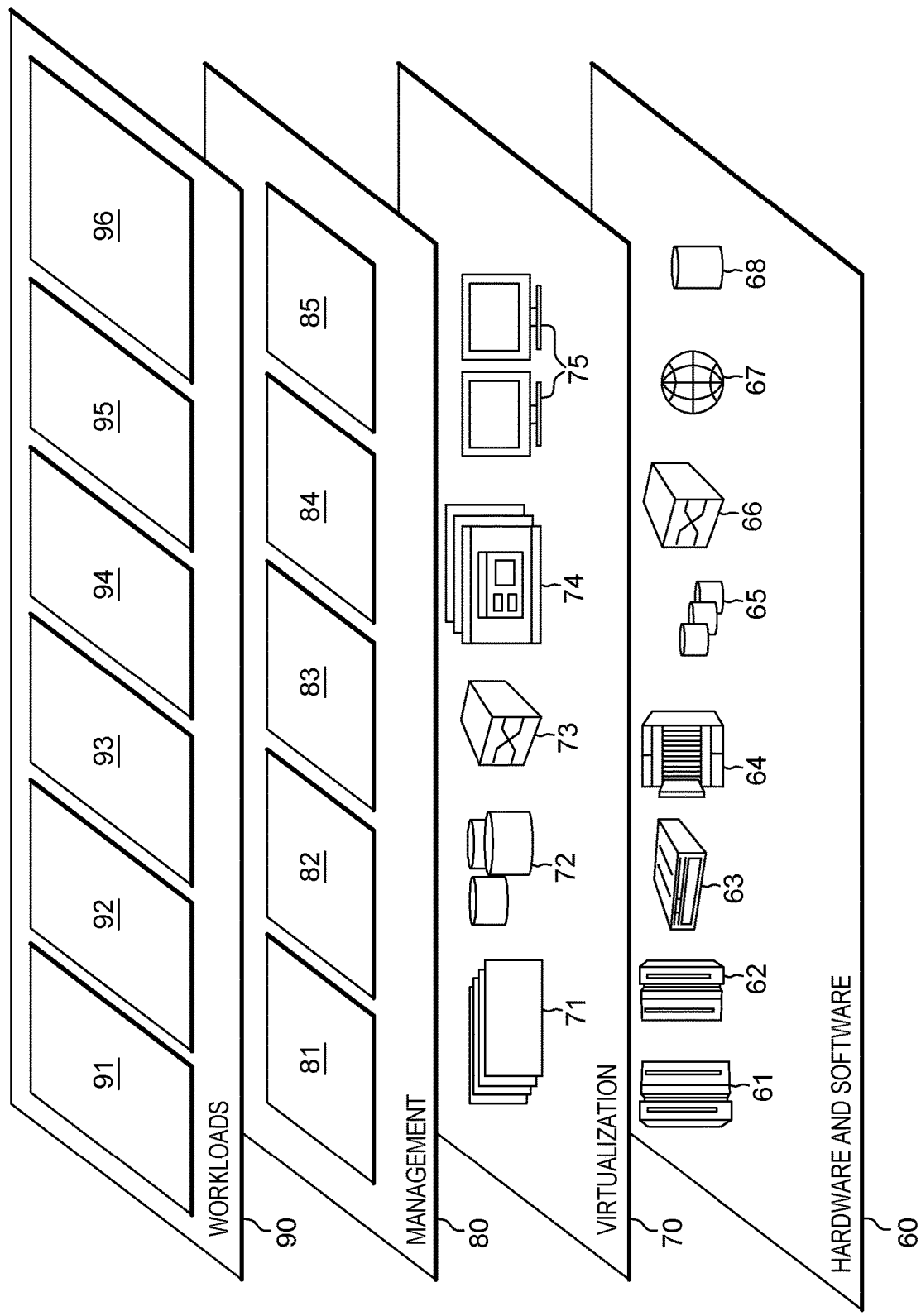
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and client edge query optimization management 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
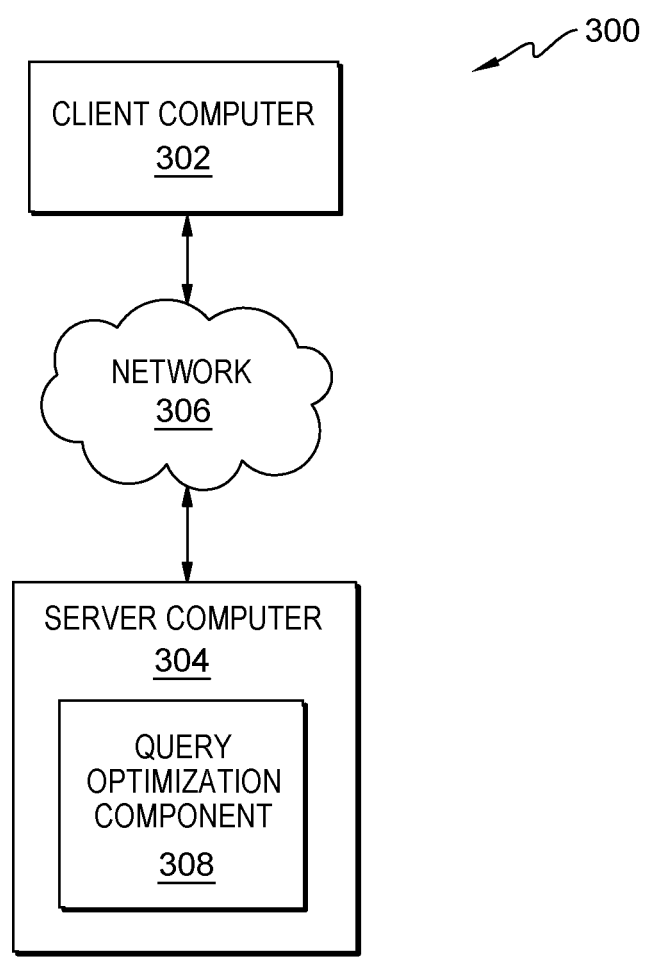
FIG. 3 is a high-level architecture, according to embodiments of the present invention.
Figure 4:
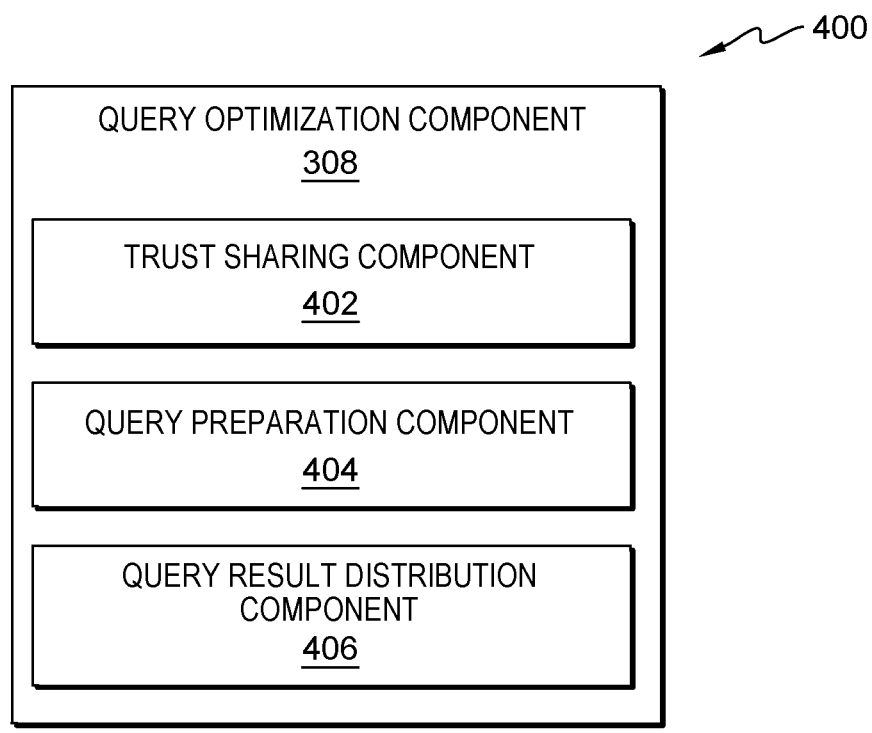
FIG. 4 is an exemplary detailed architecture, according to embodiments of the present invention.
Figure 5:
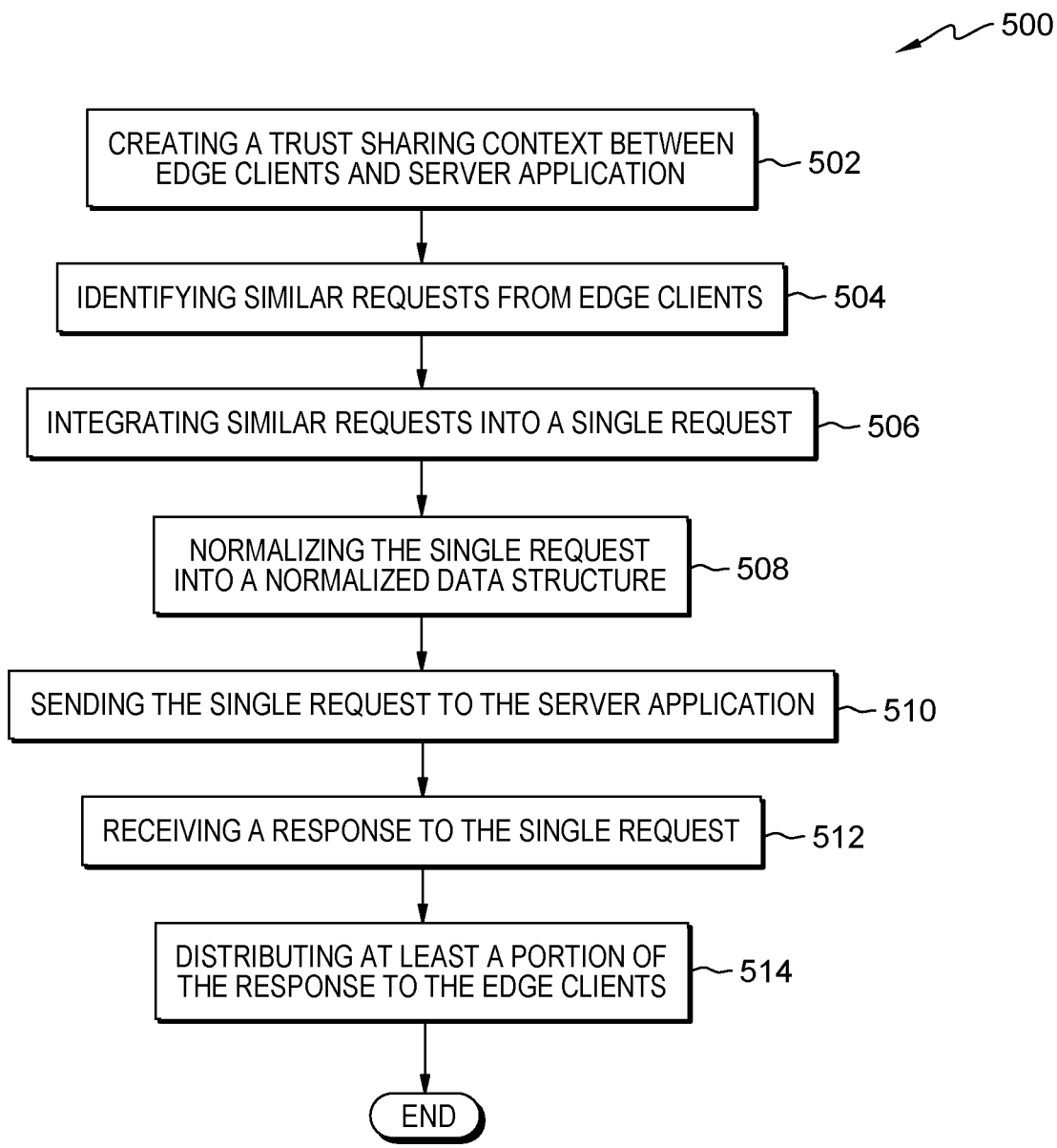
FIG. 5 is a flowchart of a method, according to embodiments of the present invention.

FIG. 3 is a high-level architecture for performing various operations of FIG. 5, in accordance with various embodiments. The architecture 300 may be implemented in accordance with the present invention in any of the environments depicted in FIGS. 1-4, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a block diagram, showing a cloud cluster query optimization system, to which the invention principles may be applied. The architecture 300 comprises a client computer 302, a query optimization component 308 operational on a server computer 304 and a network 306 supporting communication between the client computer 302 and the server computer 304.

Client computer 302 can be any computing device on which software is installed for which an update is desired or required. Client computer 302 can be a standalone computing device, management server, a web server, a mobile computing device, or any other electronic device or computing system capable of receiving, sending, and processing data. In other embodiments, client computer 302 can represent a server computing system utilizing multiple computers as a server system. In another embodiment, client computer 302 can be a laptop computer, a tablet computer, a netbook computer, a personal computer, a desktop computer or any programmable electronic device capable of communicating with other computing devices (not shown) within user persona generation environment via network 306.

In another embodiment, client computer 302 represents a computing system utilizing clustered computers and components (e.g., database server computers, application server computers, etc.) that act as a single pool of seamless resources when accessed within install-time validation environment of architecture 300. Client computer 302 can include internal and external hardware components, as depicted and described in further detail with respect to FIG. 5.

Server computer 304 can be a standalone computing device, management server, a web server, a mobile computing device, or any other electronic device or computing system capable of receiving, sending, and processing data. In other embodiments, server computer 304 can represent a server computing system utilizing multiple computers as a server system. In another embodiment, server computer 304 can be a laptop computer, a tablet computer, a netbook computer, a personal computer, a desktop computer, or any programmable electronic device capable of communicating with other computing devices (not shown) within install-time validation environment of architecture 300 via network 306.

Network 306 can be, for example, a local area network (LAN), a wide area network (WAN) such as the Internet, or a combination of the two, and can include wired, wireless, or fiber optic connections. In general, network 306 can be any combination of connections and protocols that will support communications between client computer 302 and server computer 304.

In one embodiment of the present invention, query optimization component 308, operational on server computer 304, can provide functionality of establishing a trust sharing context near the client edge. In another aspect of an embodiment of the present invention, query optimization component 308 can integrate the query requirements of the client edge applications, perform query normalization with an enhanced query structure and node business status, submit the integrated query to a target database server, receive the integrated query result from the database server, and distribute the query result to the client edge applications. It should be noted that the database server response can be improved by reducing the number of requests to the server and reducing system resource consumption. In another aspect of an embodiment of the present invention, query optimization component 308 can provide enhancements to query protocol structures to support this capability.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, more or less elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 provides a detailed view of at least some of the modules of architecture 300. Architecture 400 can comprise a query optimization component 308, which can further comprise a trust sharing component 402, a query preparation component 404, and a query result distribution component 406.

In one aspect of an embodiment of the present invention, trust sharing component 402 can establish a trust sharing context with a group of client edge applications. It should be noted that the trust sharing group can be device based and/or authentication based. For example, a group of devices can previously have established a trust relationship that can be shared with trust sharing component 402 or a group of devices can be identical in nature and identified as belonging to the same organization. In another example, a group of devices may not be identical, but can be identified by trust sharing component 402 as authenticating with the same security server or can be identified as sharing resource information.

In another aspect of an embodiment of the present invention, query preparation component 404 can provide the capability to create a query that satisfies the requirements of a series of queries from members of a group of devices, perform device resource status analytics, elect a leader for the group of devices, and apply device dedication. In another aspect of an embodiment of the present invention, query preparation component 404 can provide query normalization based on normalizing object names. For example, query preparation component 404 can normalize table names from "Table_Child" and "Table_Parent" to "TAB #2" and "TAB #1," respectively and access names from "Parent_IDX" to "TAB #1_IDX #1." In another example, query preparation component 404 can normalize table name "Street" to "TAB #1" and access name "Street_IDX" to "TAB #1_IDX #1." It should be noted that similar access paths can support normalization allowing for extension based on the examples. In another example a group of queries can be normalized based on a first query being a subset of a second query allowing for a query normalization based on the query subset.

In another aspect of an embodiment of the present invention, query preparation component 404 can normalize a group of queries based on predicate range coverage. For example, three queries:
"SELECT A.C3, B.C3 FROM TAB_2 AS B WHERE
   A.C1=B.C1 AND
   B.C2 BETWEEN 10 AND 20"
"SELECT A.C3, B.C3 FROM TAB_3 AS C, TAB_2 AS B WHERE
   A.C1=B.C1 AND
   B.C2<=15"
"SELECT B.C3 FROM TAB_2 AS B WHERE
   B.C2>=5"
can be normalized to two queries:
"SELECT A.C3, B.C3 FROM TAB_1 AS A, TAB_2 REUSE AS B WHERE
   A.C1=B.C1 AND
   B.C2 BETWEEN 10 AND 20"
"SELECT A.C3, B.C3 FROM TAB_3 AS C, TAB_2_REUSE AS B WHERE
   A.C1=B.C1 AND
   B.C2 BETWEEN 5 AND 15"
UNION ALL
"SELECT A.C3, B.C3 FROM TAB_3 AS C, TAB_2 AS B WHERE
   A.C1=B.C1 AND
   B.C2<5"

In another aspect of an embodiment of the present invention, query preparation component 404 can implement a workload-based protocol (WbP) allowing a client—database connection to create a leader for the connection and the other devices, i.e., followers. It should be noted that if a connection leader disappears from the connection, then a new leader is elected for the connection. For example, if a leader device fails, then a first timeout in leader communications can initiate an election analysis, followed by a second timeout and an election of a new leader. A follower receiving the majority votes from the servers hosting the database applications can be elected as a new leader for the group.

In one aspect, query preparation component 404 WbP implementation can provide that a candidate leader can discover current leader or a new term. In another aspect of query preparation component 404, the WbP can provide that a newly elected leader can discover devices with a higher term. It should be noted that a leader is responsible for receiving and collating client request queries, copying the client requests as log entries to the database applications on the servers, creating an integrated client request queries and confirming the integrated client request queries are safe, and submitting the integrated client request queries to a database application on an appropriate server. It should be noted that being a safe query can be defined as a leader confirming the transaction is consistency safe, i.e., the leader assures followers are in an appropriate state and do not take actions that would interrupt query execution.

For example, the election process can proceed based on all nodes starting as followers. If a follower does not receive any requests or heartbeats from other nodes for a predefined time interval, the follower can time-out, become a candidate and initiate an election. After receiving the consent of a majority of nodes, the candidate can become a leader and begin handling all operations during a predefined term. When a leader finds a node in a higher term in the cluster, the candidate becomes a follower to accept other requests.

In another aspect of an embodiment of the present invention, the timeline is broken down into different terms, with a term beginning with an election. If elected, a new leader "rules" the cluster until the next term. If there are multiple candidates and none of the candidates receives more than half of the votes, the current term can end and the election is directly conducted in the next term. It should be noted that a term can be considered a logical clock. Nodes hold a monotonically increasing term number for identification during remote procedure call (RPC) communication. If a node receives a request or heartbeat for a higher term, it will update its term for this higher term. In addition, when this node is a candidate or leader node, it indicates that a candidate/leader of a higher term already exists. Then it transforms itself into a follower node.

In another aspect of query preparation component 404, the WbP implementation can provide the capability for the leader to send an integrated request to the server-side database application, to receive the response from the database application, and to distribute the applicable portions of the response to the clients associated with the leader. It should be noted that if a new leader has been elected between send the database application request and receiving the database application response, the newly elected leader will process the outstanding database application response. It should further be noted that the WbP implementation can also provide support for Java Database Connectivity (JDBC) and Distributed Relational Database Architecture (DRDA) for clients not implemented to support WbP or when a threshold number of clients, not supporting WbP, is exceeded.

Additional aspects of the WbP implementation in query preparation component 404 can provide functionality such as, but not limited to, implementation in both an edge application and a server, a weighted list of clients in the group during edge connection, a displaceable group capacity, a dynamic general virtual connection for the groups, specific connections for the groups that are shared between the group leaders, and the ability to automatically reroute clients. It should be noted that the list of servers providing applications can be updated when a new connection is created. It should further be noted that a client can support WbP at the transaction boundary and refresh a server list in a timely manner, e.g., a heartbeat timer, etc.

In one aspect of an embodiment of the present invention, query result distribution component 406 can provide the capability to distribute the result of a query to edge devices requesting the same query or a query of which the result is a subset of an edge device presented query. It should be noted that the distributed result is based on authorization by the shared trust content. In another aspect, query result distribution component 406 can populate the devices original query structure with the result. It should be noted that query result distribution component 406 can hold partial responses for devices until a complete response is assembled.

FIG. 5 is an exemplary flowchart of a method 500 for optimizing server application response times. At step 502, an embodiment can create, via trust sharing component 402, a sharing context between edge clients and a server application. At step 504, the embodiment can identify, via query preparation component 404, similar requests from different edge clients. At step 506, the embodiment can integrate, via query preparation component 404, similar requests into a single request. At step 508, the embodiment can normalize, via query preparation component 404, the single request into a normalized data structure. At step 510, the embodiment can send, via query preparation component 404, the normalized single request to the server application. At step 512, the embodiment can receive, via query result distribution component 406, from the server application, a response to the single request. At step 514, the embodiment can distribute, via query result distribution component 406, at least a portion of the response to the edge clients.

Figure 6:
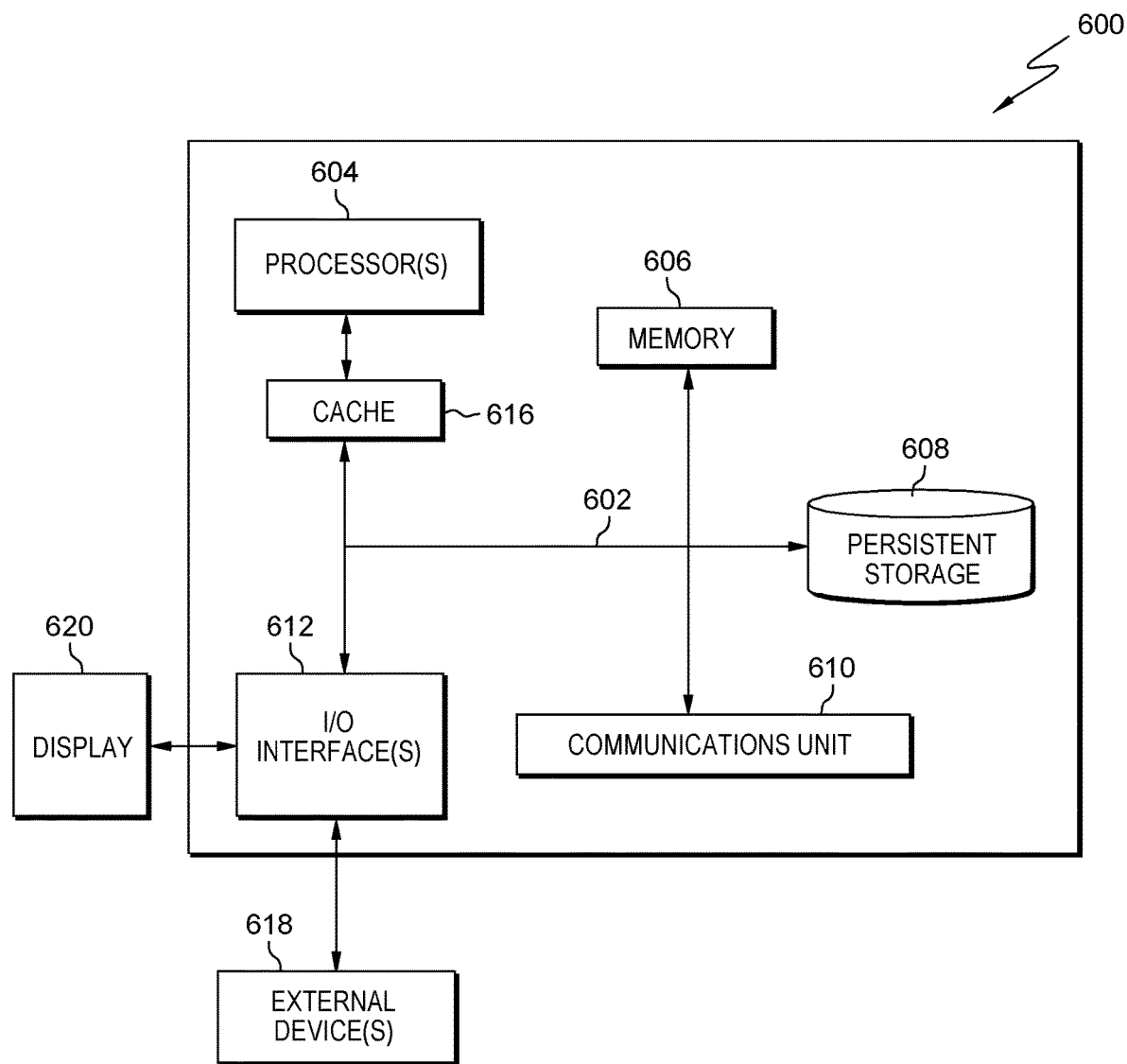
FIG. 6 is a block diagram of internal and external components of a data processing system in which embodiments described herein may be implemented, according to embodiments of the present invention.

FIG. 6 depicts computer system 600, an example computer system representative of client computer 302 and server computer 304. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for optimizing server application response times, the computer-implemented method comprising:

creating, by one or more processors, a trust sharing context between edge clients and a server application;

identifying, by the one or more processors, similar requests from the edge clients to the server application;

integrating, by the one or more processors, the similar requests into a single request;

normalizing, by the one or more processors, the single request based on normalizing object names of the similar requests in a normalized data structure;

sending, by the one or more processors, the single request to the server application;

receiving, by the one or more processors, a response to the single request from the server application; and distributing, by the one or more processors, at least a portion of the response to the edge clients.

2. The computer-implemented method of claim 1, further comprising:

electing, by the one or more processors, a leader of the edge clients based on votes from server applications.

3. The computer-implemented method of claim 2, wherein the leader sends the single request and receives the response.

4. The computer-implemented method of claim 2, wherein the leader transfers a response from the normalized data structure to data structures received in the similar requests associated with the edge clients, respectively.

5. The computer-implemented method of claim 1, wherein the trust sharing context is based on at least one of identity authentication or resource sharing information.

6. The computer-implemented method of claim 1, wherein the normalizing is based on a similar access path for a group of edge clients.

7. The computer-implemented method of claim 1, wherein the server application is a database application.

8. A computer program product for optimizing server application response times, the computer program product comprising:

one or more non-transitory computer readable storage media and program instructions stored on the one or more non-transitory computer readable storage media, the program instructions comprising:

program instructions to create a trust sharing context between edge clients and a server application;

program instructions to identify similar requests from the edge clients to the server application;

program instructions to integrate the similar requests into a single request;

program instructions to normalize the single request based on normalizing object names of the similar requests in a normalized data structure;

program instructions to send the single request to the server application;

program instructions to receive a response to the single request from the server application; and program instructions to distribute at least a portion of the response to the edge clients.

9. The computer program product of claim 8, further comprising:

program instructions to elect a leader of the edge clients based on votes from server applications.

10. The computer program product of claim 9, wherein the leader sends the single request and receives the response.

11. The computer program product of claim 9, wherein the leader transfers a response from the normalized data structure to data structures received in the similar requests associated with the edge clients, respectively.

12. The computer program product of claim 8, wherein the trust sharing context is based on at least one of identity authentication or resource sharing information.

13. The computer program product of claim 8, wherein the program instructions to normalize are based on a similar access path for a group of edge clients.

14. The computer program product of claim 8, wherein the server application is a database application.

15. A computer system for optimizing server application response times, the computer system comprising:

one or more computer processors;

one or more non-transitory computer readable storage media; and program instructions stored on the one or more non-transitory computer readable storage media, the program instructions comprising:

program instructions to create a trust sharing context between edge clients and a server application;

program instructions to identify similar requests from the edge clients to the server application;

program instructions to integrate the similar requests into a single request;

program instructions to normalize the single request based on normalizing object names of the similar requests in a normalized data structure;

program instructions to send the single request to the server application;

program instructions to receive a response to the single request from the server application; and program instructions to distribute at least a portion of the response to the edge clients.

16. The computer system of claim 15, further comprising:

program instructions to elect a leader of the edge clients based on votes from server applications.

17. The computer system of claim 16, wherein the leader sends the single request and receives the response.

18. The computer system of claim 16, wherein the leader transfers a response from the normalized data structure to data structures received in the similar requests associated with the edge clients, respectively.

19. The computer system of claim 15, wherein the trust sharing context is based on at least one of identity authentication or resource sharing information.

20. The computer system of claim 15, wherein the program instructions to normalize are based on a similar access path for a group of edge clients and the server application is a database application.

\* \* \* \* \*